United States Patent
Orschel et al.

(10) Patent No.: US 10,007,255 B2
(45) Date of Patent: Jun. 26, 2018

(54) SYSTEMS AND METHODS FOR CONTROLLING TEMPERATURES IN AN EPITAXIAL REACTOR

(71) Applicant: SunEdison Semiconductor Limited (UEN201334164H), Singapore (SG)

(72) Inventors: Benno Orschel, St. Louis, MO (US); Arash Abedijaberi, St. Peters, MO (US); Gang Wang, St. Peters, MO (US); Ellen Torack, St. Louis, MO (US)

(73) Assignee: SunEdison Semiconductor Limited (UEN201334164H), Singapore (SG)

( * ) Notice: Subject to any disclaimer, the term of this patent is extended or adjusted under 35 U.S.C. 154(b) by 863 days.

(21) Appl. No.: 14/318,111

(22) Filed: Jun. 27, 2014

(65) Prior Publication Data

US 2015/0378372 A1 Dec. 31, 2015

(51) Int. Cl.
*G05D 23/19* (2006.01)
*G05B 19/418* (2006.01)

(52) U.S. Cl.
CPC ....... *G05B 19/418* (2013.01); *G05D 23/1917* (2013.01); *G05B 2219/45032* (2013.01)

(58) Field of Classification Search
CPC ........ G05B 19/418; G05B 2219/45032; G05D 23/1917

USPC ......................................................... 700/121
See application file for complete search history.

(56) References Cited

U.S. PATENT DOCUMENTS

| | | | | |
|---|---|---|---|---|
| 5,593,608 A | * | 1/1997 | Suzuki | H05B 1/0233 219/486 |
| 6,911,628 B1 | * | 6/2005 | Hirayama | G05B 5/01 219/483 |
| 2004/0005147 A1 | * | 1/2004 | Wang | G01K 15/005 392/418 |

* cited by examiner

*Primary Examiner* — Thomas C Lee
*Assistant Examiner* — Alan Chu
(74) *Attorney, Agent, or Firm* — Armstrong Teasdale LLP

(57) ABSTRACT

A method for controlling temperatures in an epitaxial reactor for use in a wafer-production process is provided. The method is implemented by a computing device coupled to a memory. The method includes transmitting, to a heating device in a first zone of the epitaxial reactor, an output power instruction representing a base output power. The method additionally includes determining an actual time period for a temperature in the first zone of the epitaxial reactor to reach a target temperature, determining a difference between the actual time period and a reference time period, determining an output power offset based on the difference, and storing the output power offset in the memory in association with the heating device.

20 Claims, 6 Drawing Sheets

SYSTEMS AND METHODS FOR CONTROLLING TEMPERATURES IN AN EPITAXIAL REACTOR

FIELD

The field relates generally to temperature control, and more particularly to systems and methods for controlling temperatures within an epitaxial reactor.

BACKGROUND

In at least some known epitaxial reactors used in processing semiconductor wafers, temperatures within the reactors are controlled by multiple proportional-integral-derivative (PID) controllers, each controlling a respective zone. For example, in some systems, an epitaxial reactor includes a first PID controller associated with a center zone, a second PID controller associated with a front zone, a third PID controller associated with a side zone, and a fourth PID associated with a rear zone.

Given that PID controllers are configured to control temperatures during steady state conditions, control errors may occur during transitions to new temperature set points. In particular, multi-PID arrangements controlling different zones that interact with each other, for example from heat originating from one zone and transferring into a neighboring zone, may be inadequate for controlling relatively fast state transitions. This is especially problematic when the relative balance between different zones needs to be precisely controlled throughout a transition. For example, during the processing of a semiconductor wafer in an epitaxial reactor, temperature gradients across the various zones may cause the wafer to experience thermal stress and develop defects, rendering the wafer unusable. Given these limitations, transitions to new temperature set points have to be prolonged to allow the PIDs to achieve the desired temperature set points without causing defects in the wafer. Accordingly, manufacturing throughput for semiconductor wafers could be increased if transitions to new temperature set points could be achieved in multiple-PID epitaxial reactors at increased speed.

BRIEF DESCRIPTION

In one aspect, a method for controlling temperatures in an epitaxial reactor for use in a wafer-production process is provided. The method is implemented by a computing device coupled to a memory. The method includes transmitting, to a heating device in a first zone of the epitaxial reactor, an output power instruction representing a base output power. The method additionally includes determining an actual time period for a temperature in the first zone of the epitaxial reactor to reach a target temperature, determining a difference between the actual time period and a reference time period, determining an output power offset based on the difference, and storing the output power offset in the memory in association with the heating device.

In another aspect, a system for controlling temperatures in an epitaxial reactor for use in a wafer-production process is provided. The system includes a computing device coupled to a memory. The computing device is configured to transmit, to a heating device in a first zone of the epitaxial reactor, an output power instruction representing a base output power, determine an actual time period for a temperature in the first zone of the epitaxial reactor to reach a target temperature, determine a difference between the actual time period and a reference time period, determine an output power offset based on the difference, and store the output power offset in the memory in association with the heating device.

In another aspect, a computer-readable storage medium having computer-executable instructions embodied thereon is provided. When executed by a computing device having a processor in communication with a memory, the computer-executable instructions cause the computing device to transmit, to a heating device in a first zone of an epitaxial reactor, an output power instruction representing a base output power. The instructions additionally cause the computing device to determine an actual time period for a temperature in the first zone of the epitaxial reactor to reach a target temperature, determine a difference between the actual time period and a reference time period, determine an output power offset based on the difference, and store the output power offset in the memory in association with the heating device.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Figure 1:
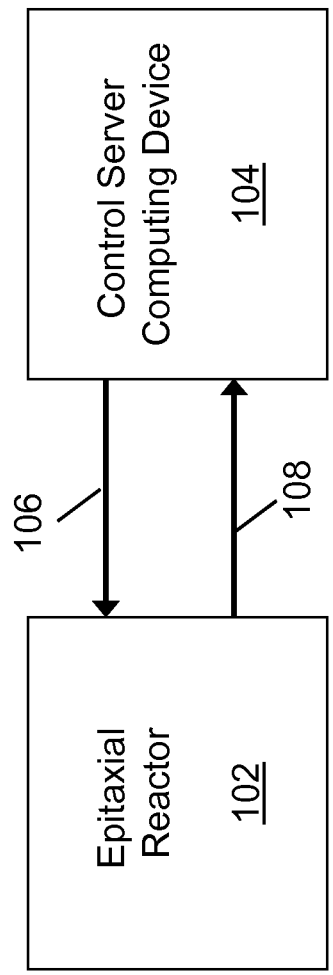
FIG. 1 is a diagram of an example relationship between an epitaxial reactor and a control server computing device.

FIG. 1 is a diagram of a relationship 100 between an epitaxial reactor 102 and a control server computing device 104. Control server computing device 104 is communicatively coupled to epitaxial reactor 102 to transmit instructions 106 and receive data 108 for use in controlling temperatures in epitaxial reactor 102. More specifically, control server computing device 104 transmits instructions 106, such as output power instructions for one or more heating devices (FIG. 3) in epitaxial reactor 102. Epitaxial reactor 102 transmits data 108, such as temperature measurements, to control server computing device 104 as feedback. As described herein, the transmission of instructions 106 to epitaxial reactor 102 and data 108 from epitaxial reactor enables control server computing device 104 to determine output power offsets and output power instructions that compensate for heat transfer among zones within epitaxial reactor 102. Accordingly, the zones of the epitaxial reactor may transition to new temperature set points more rapidly and with more stability than in prior art systems.

Figure 2:
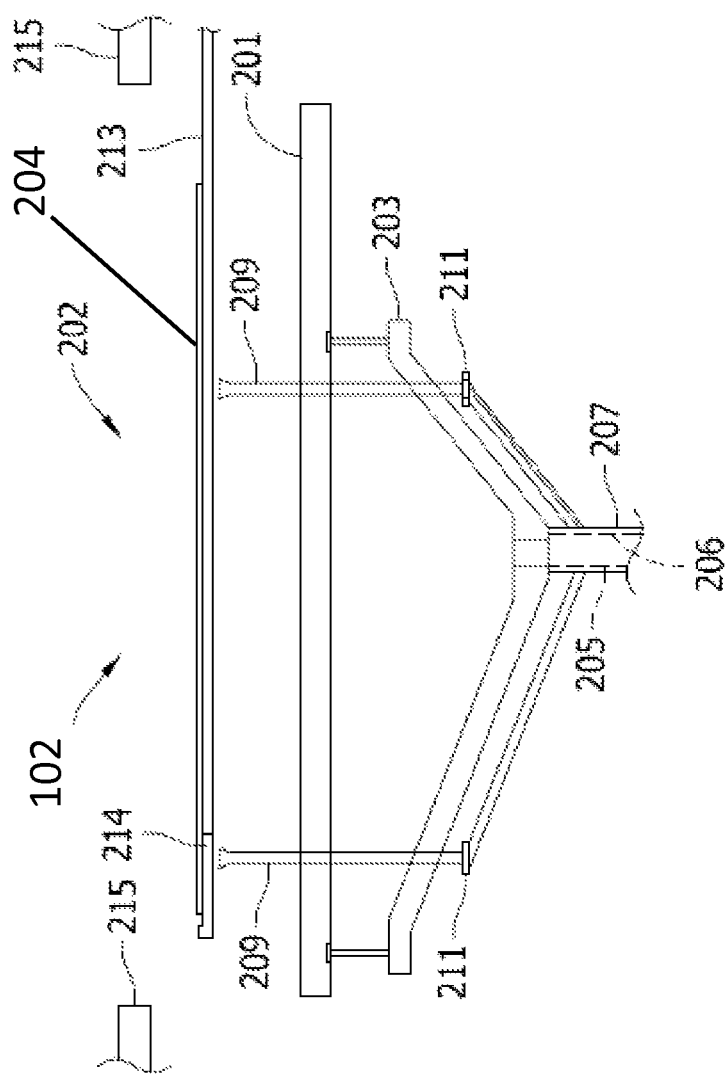
FIG. 2 is a side view of components included in the epitaxial reactor of FIG. 1.

FIG. 2 is a side view of components included in epitaxial reactor 102. A positioning mechanism 202 within the epitaxial reactor 102 operates to position a silicon wafer 204 during various phases of a chemical vapor deposition processes within a chamber of the epitaxial reactor 102. The wafer may be supported by a susceptor 201. Susceptor 201 is mounted on arms 203, which, in turn, are mounted to a susceptor support shaft 205. Susceptor support shaft 205 is slidingly mounted within a bore 206 of a wafer lift shaft 207. A pneumatic mechanism (not shown) is operable to raise and lower susceptor support shaft 205 and wafer lift shaft 207 to various positions. The pneumatic mechanism (not shown) may also rotate susceptor 201. Rigid pins 209 are slidingly mounted to susceptor 201 and, when not elevated by susceptor 201, are supported by stops 211 of wafer lift shaft 207. Rigid pins 209 may support the wafer when brought into contact with the wafer.

During an exchange phase, a blade 213 carries wafer 204 into position above pins 209. Subsequently, wafer lift shaft 207 elevates, causing pins 209 to translate upwards and support wafer 204. Blade 213 includes a notch 214 to allow room for one of pins 209 that would otherwise collide with blade 213. Once wafer 204 is supported by pins 209, blade 213 is withdrawn from epitaxial reactor 102. Next, susceptor support shaft 205 elevates, causing susceptor 201 to move upwards and come into contact with wafer 204. Thereafter, wafer 204 is supported by susceptor 201. Susceptor support shaft 205 continues to elevate until susceptor 201 and wafer 204 are level with ring 215. At this point, wafer 204 and susceptor 201 are in the "process" position. When in the process position, susceptor 201 rotates as heating devices, such as heat lamps, within epitaxial reactor 102 heat wafer 204. Additionally, valves (not shown) are opened and closed to release various gases 260 (FIG. 3) at precise temperatures, pressures, and times. For example, wafer 204 may undergo a pretreatment process during which a silicon oxide layer is removed from the surface of wafer 204.

During the pretreatment process, the epitaxial reactor 200 heats wafer 204, using heating devices, such as heat lamps, to 1150 to 1220° C. The heating devices are controlled to raise the temperature in one or more zones within epitaxial reactor 102. Then the chamber of the epitaxial reactor 200 is filled with $H_2$ and wafer 204 is annealed for 10 to 15 seconds. Next, an epitaxial layer is deposited on wafer 204. The chamber of the epitaxial reactor 102 is filled with a carrier gas, such as $H_2$, and a silicon-containing gas, for example, $SiHCL_3$, at atmospheric pressure. The surface of wafer 204 is maintained at a temperature of at least 900° C. during this process. After a predetermined time, the silicon-containing gas is purged with, for example, $H_2$. Wafer 204 is then heated further, for a predetermined duration, for example 10 seconds. Next wafer 204 is cooled until it reaches 800° C. During this cooling process, susceptor 201 is lowered such that wafer 204 is supported only by pins 209.

Figure 3:
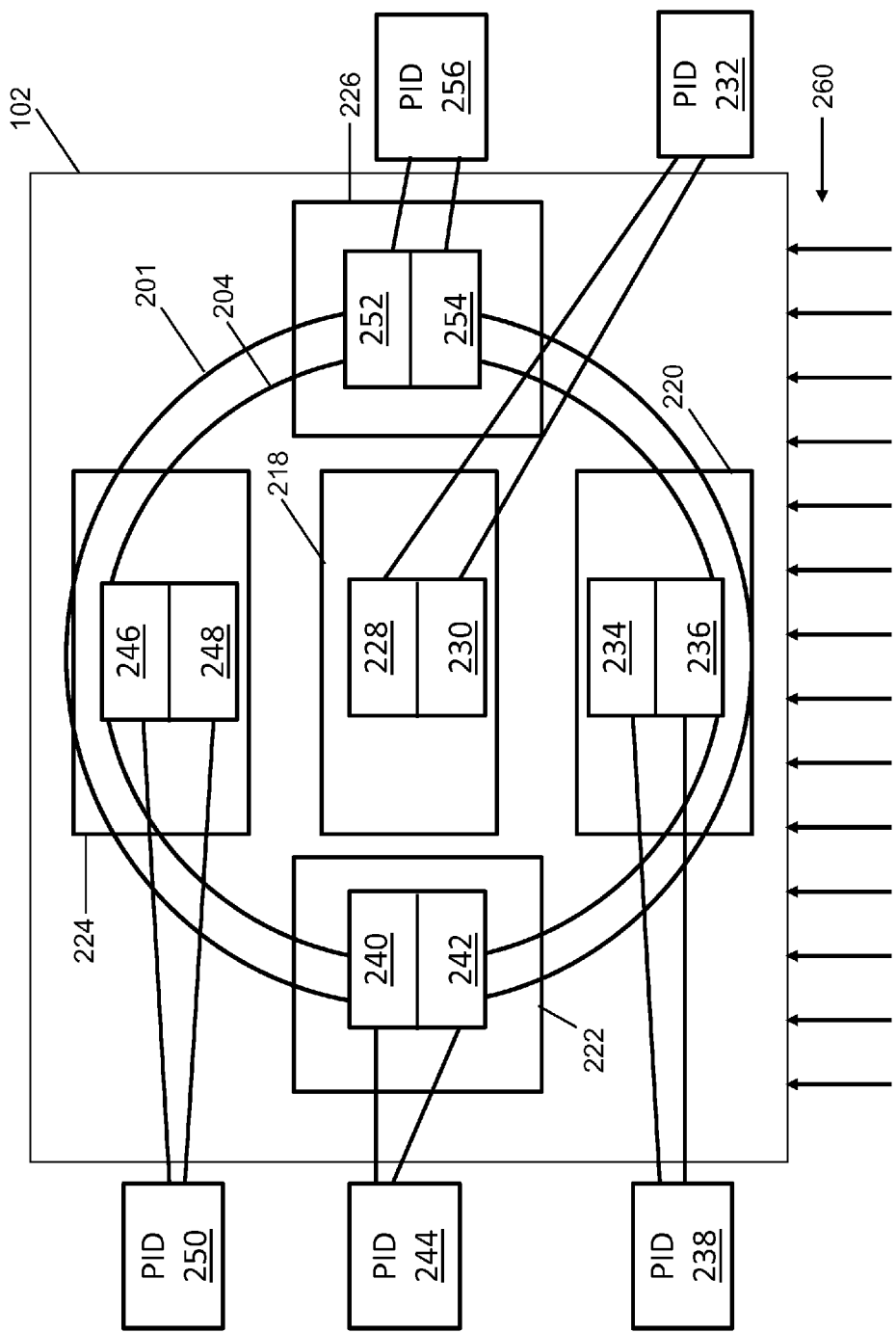
FIG. 3 is a plan view of components included in the epitaxial reactor of FIG. 1.

FIG. 3 is a plan view of epitaxial reactor 102, including certain components that are not shown in FIG. 2. Wafer 204 is supported on susceptor 201. During the processes described above, with respect to FIG. 2, gases 260 enter into epitaxial reactor 102 as described above. Epitaxial reactor 102 includes a center zone 218, a front zone 220, a first side zone 222, a rear zone 224, and a second side zone 226. In center zone 218, epitaxial reactor 102 includes a center heating device 228, such as a heat lamp, and a center thermocouple 230 that measures the temperature of center zone 218. A first PID 232 is coupled to and controls the power output of center heating device 228, and receives the measured temperature of center zone 218 from center thermocouple 230, in a feedback loop. Similarly, in front zone 220, epitaxial reactor 102 includes a front heating device 234, for example a heat lamp, and a front thermocouple 236 that measures the temperature of front zone 220. A second PID 238 is coupled to and controls the power output of front heating device 234 and receives the measured temperature of front zone 220 from front thermocouple 236, in a feedback loop. Additionally, epitaxial reactor 102 includes, in first side zone 222, a first side heating device 240, such as a heat lamp, and a first side thermocouple 242 that measures the temperature of first side zone 222.

A third PID 244 is coupled to and controls the power of first side heating device 240 and receives the measured temperature of first side zone 222 from first side thermocouple 242, in a feedback loop. Further, epitaxial reactor 102 includes, in rear zone 224, a rear heating device 246, such as a heat lamp, and a rear thermocouple 248 that measures the temperature of rear zone 224. A fourth PID 250 is coupled to and controls the power of rear heating device 246 and receives the measured temperature of rear zone 224 from rear thermocouple 248, in a feedback loop. In some implementations, epitaxial reactor 102 includes a second side heating device 252, a second side thermocouple 254, and a fifth PID 256 for second side zone 226. In other implementations, fifth PID 256 and second side thermocouple 254 are not present and third PID 244 controls the power of second side heating device 252 based on the temperature measured by first side thermocouple 242. In some implementations, one or more of first PID 232, second PID 238, third PID 244, fourth PID 250, and fifth PID 256 are included within control server computing device 104.

Figure 4:
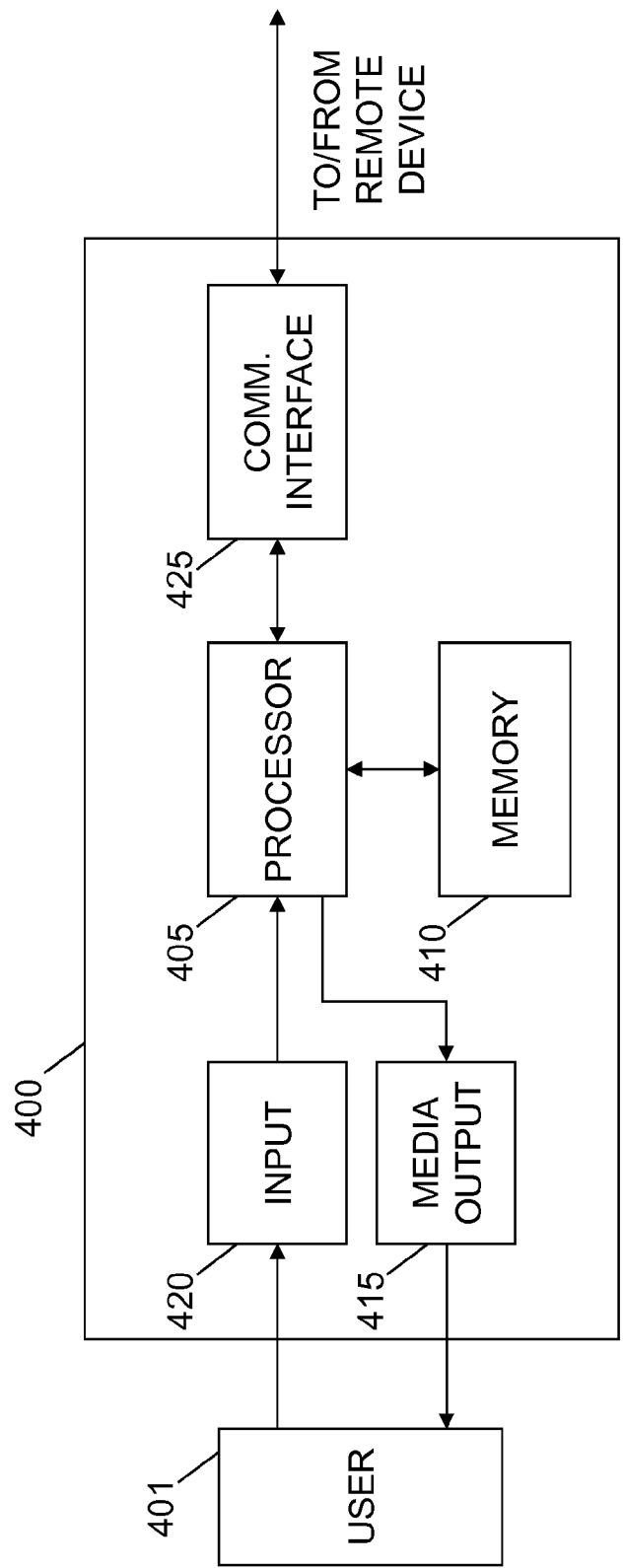
FIG. 4 illustrates a configuration of an example computing device.

FIG. 4 illustrates a configuration of a computing device 400 in accordance with an exemplary embodiment of the present disclosure. For example, computing device 400 is representative of control server computing device 104. PIDs 232, 238, 244, 250, and 256 include all or a subset of the components of computing device 400. Computing device 400 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or data to be stored and retrieved. Memory area 410 may include one or more computer readable storage device or other computer readable media, including transitory and non-transitory computer readable media.

In at least some implementations, computing device 400 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 415.

In some embodiments, computing device 400 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Computing device 400 may also include a communication interface 425, which may be communicatively coupled to a remote computing device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, processor-executable instructions for providing a user interface to user 401 via media output component 415 and, optionally, receiving and processing input from input device 420. Memory area 410 may include, but is not limited to, any computer-operated hardware suitable for storing and/or retrieving processor-executable instructions and/or data. Memory area 410 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 410 may include multiple storage units such as hard disks or solid state disks in a redundant array of inexpensive disks (RAID) configuration. Memory area 410 may include a storage area network (SAN) and/or a network attached storage (NAS) system. In some embodiments, memory area 410 includes memory that is integrated in computing device 400. For example, computing device 400 may include one or more hard disk drives as memory 410. Memory area 410 may also include memory that is external to computing device 400 and may be accessed by a plurality of computing devices 400. The above memory types are exemplary only, and are thus not limiting as to the types of memory usable for storage of processor-executable instructions and/or data.

Figure 5:
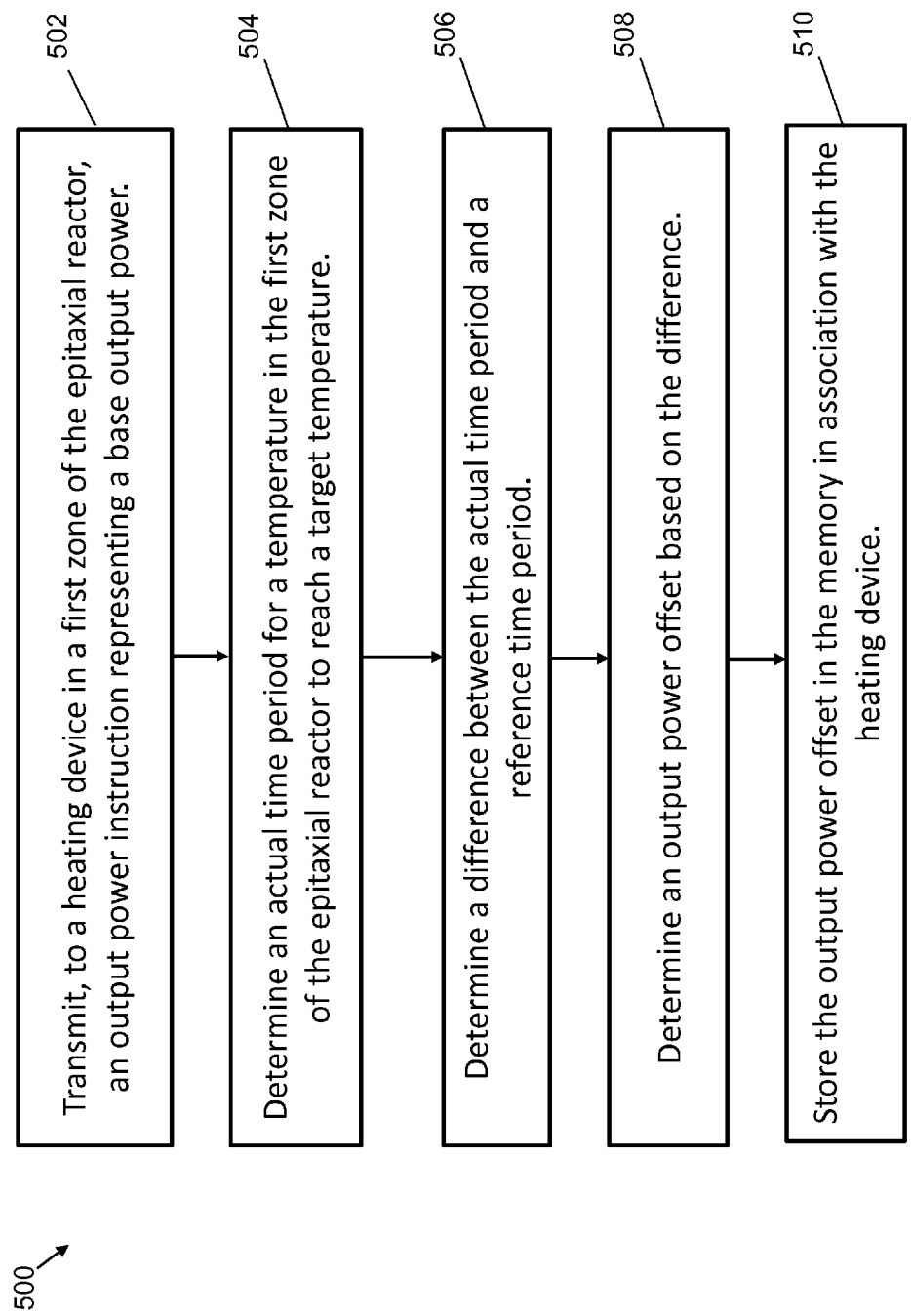
FIG. 5 is a flowchart of an example process that may be implemented by the control server computing device for controlling temperatures in the epitaxial reactor of FIG. 1.

FIG. 5 is a flowchart of an example process 500 that may be implemented by a computing device, for example control server computing device 104, for controlling temperatures in an epitaxial reactor, for example epitaxial reactor 102, for use in a wafer-production process. Control server computing device 104 transmits 502, to a heating device (e.g., center heating device 228) in a first zone (e.g., center zone 218) of epitaxial reactor 102, an output power instruction 106 representing a base output power (e.g. 500 Watts). Additionally, control server computing device 104 determines 504 an actual time period for a temperature in the first zone of the epitaxial reactor to reach a target temperature. For example, control server computing device 104 receives the temperature in center zone 218 from center thermocouple 230 at periodic intervals, as part of data 108, and determines the actual amount of time for the temperature in center zone 218 to reach the target temperature. The target temperature may be stored in memory 410, for example as part of a "recipe" or series of target temperatures for different phases of the process.

Additionally, control server computing device 104 determines 506 a difference between the actual time period and a reference time period. For example, the actual time period may be 10 seconds longer than the reference time period. The reference time period may be stored in memory 410, for example as part of the recipe for the process. As an example, according to the recipe, center zone 218 should reach the target temperature 10 seconds faster than it did. Accordingly, the difference between the actual time period and the reference time period is 10 seconds. Further, control server computing device 104 determines 508 an output power offset based on the difference. The output power offset may be, for example, 100 Watts. Additionally, control server computing device 104 stores 510 the output power offset in memory 410 in association with the heating device (e.g., center heating device 228). Control server computing device 104 may then transmit a power output instruction 106 to central heating device 228 that represents the base output power plus the output power offset, thereby causing the temperature of center zone 218 to reach the target temperature faster. In some implementations, control server computing device 104 iterates the process described above to adjust the output power offset until it causes center zone 218 to reach the target temperature within the reference time period, or within a predetermined range (e.g., one second) of the reference time period.

In some implementations, the output power instruction is a first output power instruction, and control server computing device 104 transmits to the heating device (e.g., center heating device 228), a second output power instruction 106 representing a sum of the base output power and the output power offset. In some implementations, the actual time period is a first actual time period and the difference is a first difference. In such implementations, control server computing device 104 determines a second actual time period for the first zone (e.g., center zone 218) of epitaxial reactor 102 to reach the target temperature after transmitting the second output power instruction 106. Additionally control server computing device 104 determines a second difference between the second actual time period and the reference time period, and adjusts the output power offset based on the second difference.

In some implementations, the output power instruction 106 is a first output power instruction, the first zone (e.g., center zone 218) is one of a plurality of zones (e.g., center zone 218, front zone 220, first side zone 222, rear zone 224, and second side zone 226) in epitaxial reactor 102, and the heating device (e.g., center heating device 228) is a first heating device of a plurality of heating devices (e.g., center heating device 228, front heating device 234, first side heating device 240, rear heating device 246, and second side heating device 252) in epitaxial reactor 102. Control server computing device 104 transmits a second power output instruction 106 to a second heating device (e.g., front heating device 234) associated with a second zone (e.g., front zone 220), transmit a third power output instruction 106 to a third heating device (e.g., first side heating device 240) associated with a third zone (e.g., first side zone 222), and transmits a fourth power output instruction 106 to a fourth heating device (e.g., rear heating device 246) associated with a fourth zone (e.g., rear zone 224).

In some implementations, the output power instruction is a first output power instruction 106, the first zone (e.g., center zone 218) is one of a plurality of zones (e.g., center zone 218, front zone 220, first side zone 222, rear zone 224, and second side zone 226) in epitaxial reactor 102, and the heating device (e.g., center heating device 228) is a first heating device of a plurality of heating devices (e.g., center heating device 228, front heating device 234, first side heating device 240, rear heating device 246, and second side heating device 252) in the epitaxial reactor 102. Control server computing device 104 transmits a second power output instruction 106 to a second heating device (e.g., front heating device 234) associated with a second zone (e.g., front zone 220). The second power output instruction 106 represents at least a ratio of a sum of the base output power and the output power offset associated with the first heating device (e.g., center heating device 228). More specifically, if the base output power for center heating device 228 is 500 Watts and the output power offset for center heating device 228 is 100 Watts, totaling 600 Watts, the second power output instruction 106 transmitted to the second heating device (e.g., front heating device 234) may be based on a ratio, for example 0.75, of the total 600 Watts (i.e., 450 Watts).

In some implementations, similar to the implementations described above, the base output power (e.g., 500 Watts) is a first base output power, and the output power offset (e.g., 100 Watts) is a first output power offset, and when control server computing device 104 transmits the second power instruction 106 to the second heating device (e.g., front heating device 234), the second power instruction 106 additionally represents a second base output power and a second power offset that are associated with the second heating device (e.g., front heating device 234). For example, control server computing device 104 may have performed a process similar to process 500, for the second heating device (e.g., front heating device 234) and, accordingly, memory 410 includes a base power output and a power output offset associated with the second heating device (e.g., front heating device 234). Accordingly, the second power instruction is 450 Watts plus the sum of the base power output associated with the second heating device and the power output offset associated with the second heating device.

In some implementations, control server computing device 104 transmits the first power output instruction during a first phase of the wafer-production process (e.g., a ramp up phase) and transmits the second power instruction during a second phase (e.g., a steady-state phase) of the wafer-production process, or vice versa. In other words, the second phase is not contemporaneous with the first phase.

Figure 6:
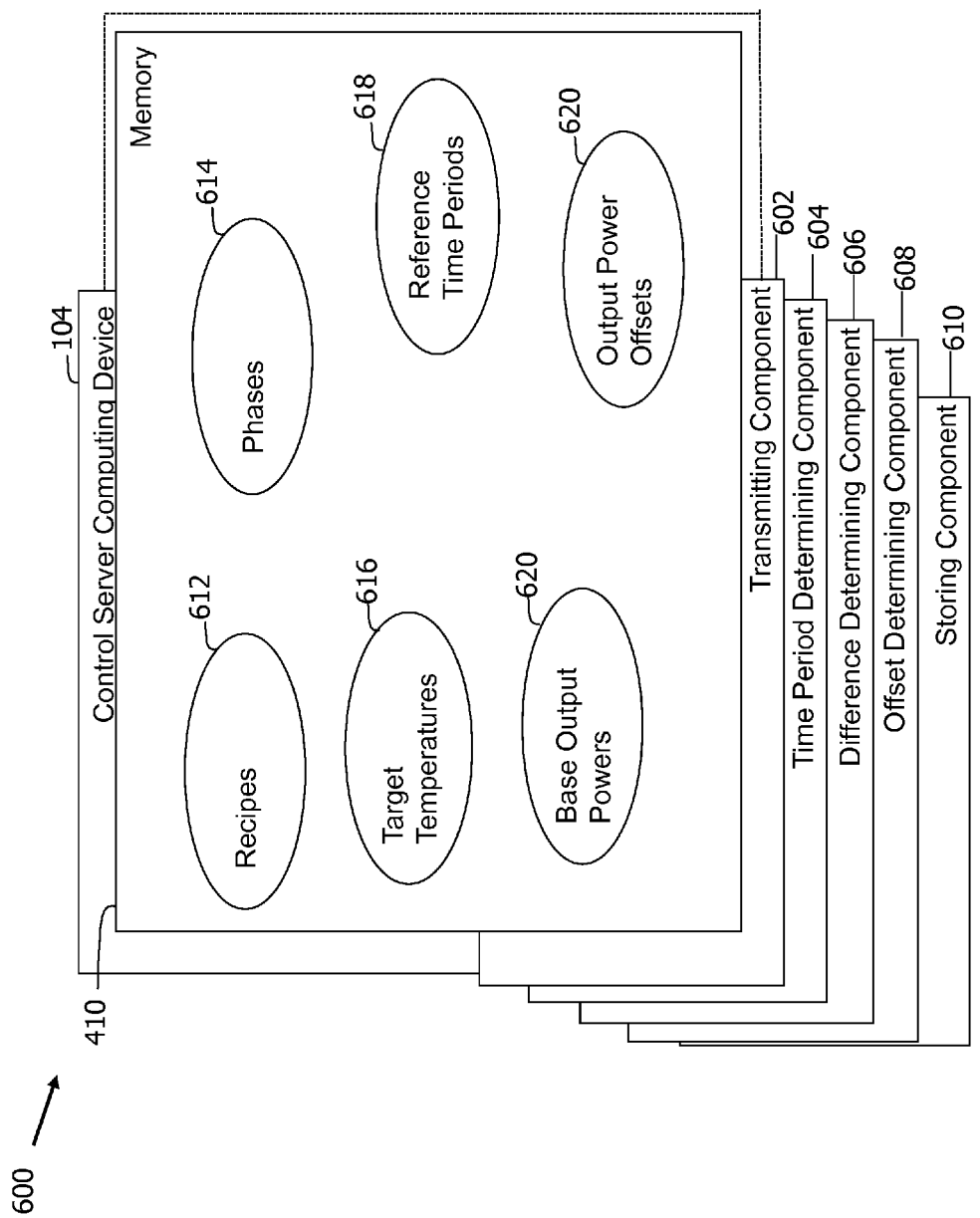
FIG. 6 is a diagram of components of one or more example computing devices that may be used in embodiments of the described systems and methods.

FIG. 6 is a diagram 600 of components of one or more example computing devices, for example control server computing device 104, that may be used in embodiments of the described systems and methods. FIG. 6 further shows a configuration of data in memory 410 (FIG. 4).

Control server computing device 104 includes a transmitting component 602 for transmitting, to a heating device in a first zone of the epitaxial reactor 102, an output power instruction representing a base output power. Control server computing device 104 additionally includes a time period determining component 604 for determining an actual time period for a temperature in the first zone of the epitaxial reactor to reach a target temperature. Additionally, control server computing device 104 includes a difference determining component 606 for determining a difference between the actual time period and a reference time period. Control server computing device 104 also includes an offset determining component 608 for determining an output power offset based on the difference. Control server computing device 104 additionally includes a storing component 610 for storing the output power offset in the memory 410 in association with the heating device.

In an example embodiment, data in memory 410 is divided into a plurality of sections, including but not limited to, a recipes section 612, a phases section 614, a target temperatures section 616, a reference time periods section 618, a base output powers section 620, and an output power offsets section 622. These sections within memory 410 are interconnected to retrieve and store information in accordance with the functions and processes described above.

A technical effect of systems and methods described herein includes at least one of: (a) transmitting, to a heating device in a first zone of the epitaxial reactor, an output power instruction representing a base output power; (b) determining an actual time period for a temperature in the first zone of the epitaxial reactor to reach a target temperature; (c) determining a difference between the actual time period and a reference time period; (d) determining an output power offset based on the difference; and (e) storing the output power offset in a memory in association with the heating device.

As compared to known systems and methods for controlling temperatures in an epitaxial reactor having multiple zones independently controlled by separate PID controllers, the systems and methods described enable more rapid and stable transitions between temperature set points. Accordingly, processes that require transitions between temperature set points can be performed more quickly than in the prior art systems and manufacturing output may be increased accordingly.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405 including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method of determining a output power offset of a heating device for controlling temperatures in an epitaxial reactor for use in a wafer-production process, the method is implemented by a computing device coupled to a memory, the method comprising:
    (a) transmitting, to a heating device in a first zone of the epitaxial reactor, an output power instruction representing a base output power;
    (b) determining an actual time period for a temperature in the first zone of the epitaxial reactor to reach a target temperature;
    (c) determining a difference between the actual time period and a reference time period;
    (d) determining an output power offset based on the difference; and
    (e) storing the output power offset in the memory in association with the heating device;
    (f) iterating steps (a)-(e) to adjust the output power offset until the determined output power offset causes the temperature in the first zone to reach the target temperature within a predetermined range of the reference time period wherein each subsequent base output power equals the previous base output power plus the current output power offset.

2. The method of claim 1, wherein the output power instruction is a first output power instruction, said method further comprising transmitting, to the heating device, a second output power instruction representing a sum of the base output power and the stored output power offset.

3. The method of claim 2, wherein the actual time period is a first actual time period and the difference is a first difference, said method further comprising:
    determining a second actual time period for the first zone of the epitaxial reactor to reach the target temperature after transmitting the second output power instruction;
    determining a second difference between the second actual time period and the reference time period; and
    adjusting the output power offset based on the second difference.

4. The method of claim 1, wherein the output power instruction is a first output power instruction, the first zone is one of a plurality of zones in the epitaxial reactor, and the heating device is a first heating device of a plurality of heating devices in the epitaxial reactor, said method further comprising:
    transmitting a second output power instruction to a second heating device associated with a second zone;
    transmitting a third output power instruction to a third heating device associated with a third zone; and
    transmitting a fourth output power instruction to a fourth heating device associated with a fourth zone.

5. The method of claim 1, wherein the output power instruction is a first output power instruction, the first zone is one of a plurality of zones in the epitaxial reactor, and the heating device is a first heating device of a plurality of heating devices in the epitaxial reactor, said method further comprising transmitting a second output power instruction to a second heating device associated with a second zone, wherein the second output power instruction represents at least a ratio of a sum of the base output power and the output power offset associated with the first heating device.

6. The method of claim 5, wherein the base output power is a first base output power, and the output power offset is a first output power offset, and transmitting the second output power instruction further comprises transmitting the second output power instruction additionally representing a second base output power and a second power offset associated with the second heating device.

7. The method of claim 5, wherein transmitting the first output power instruction further comprises transmitting the first output power instruction during a first phase of the wafer-production process and transmitting the second power instruction further comprises transmitting the second power instruction during a second phase of the wafer-production process, wherein the second phase is not contemporaneous with the first phase.

8. A system for determining an output power offset of a heating device used for controlling temperatures in an epitaxial reactor for use in a wafer-production process, said system comprising a computing device coupled to a memory, said computing device configured to:
    (a) transmit, to a plurality of heating devices in respective heating zones of the epitaxial reactor, an individualized output power instruction representing a respective base output power supplied to each heating device of the plurality of heating devices;
    (b) determine an actual time period for a temperature in each of the respective heating zones of the epitaxial reactor to reach a target temperature;
    (c) determine a difference between the actual time period and a respective reference time period;
    (d) determine an output power offset for each of the plurality of heating devices based on the difference; and
    (e) store the output power offset for each of the plurality of heating devices in the memory in association with the respective heating device;
    (f) iterating steps (a)-(e) to adjust the output power offset until the determined output power offset causes the temperatures in the respective heating zones to reach the target temperature within a predetermined range of the respective reference time period wherein each subsequent respective base output power equals the previous respective base output power plus the current respective output power offset.

9. The system of claim 8, wherein the individualized output power instruction is a first output power instruction, and said computing device is additionally configured to transmit, to each of the plurality of heating devices a second individualized output power instruction representing a sum of the respective base output power and the output power offset determined for each of the plurality of heating devices.

10. The system of claim 9, wherein the actual time period is a first actual time period and the difference is a first difference, and said computing device is additionally configured to:
 determine a second actual time period for the respective heating zones of the epitaxial reactor to reach the target temperature after transmitting the second output power instruction;
 determine a second difference between the second actual time period and the respective reference time period; and
 adjust the output power offset of each of the plurality of heating devices based on the respective second difference.

11. The system of claim 8, wherein the individualized output power instruction is a first output power instruction and the heating device is a first heating device of a plurality of heating devices in the epitaxial reactor, and said computing device is additionally configured to:
 transmit a second respective output power instruction to a second heating device of the plurality of heating devices associated with a second zone;
 transmit a third output power instruction to a third heating device associated with a third zone; and
 transmit a fourth output power instruction to a fourth heating device associated with a fourth zone.

12. The system of claim 8, wherein the output power instruction is a first output power instruction, the first zone is one of a plurality of zones in the epitaxial reactor, and the heating device is a first heating device of a plurality of heating devices in the epitaxial reactor, and said computing device is additionally configured to transmit a second output power instruction to a second heating device associated with a second zone, wherein the second output power instruction represents at least a ratio of a sum of the base output power and the output power offset associated with the first heating device.

13. The system of claim 12, wherein the base output power is a first base output power, and the output power offset is a first output power offset, and said computing device is additionally configured such that transmitting the second power instruction further comprises transmitting the second power instruction additionally representing a second base output power and a second power offset associated with the second heating device.

14. The system of claim 12, wherein said computing device is additionally configured such that transmitting the first output power instruction further comprises transmitting the first output power instruction during a first phase of the wafer-production process and transmitting the second output power instruction further comprises transmitting the second output power instruction during a second phase of the wafer-production process, wherein the second phase is not contemporaneous with the first phase.

15. A computer-readable storage medium having computer-executable instructions embodied thereon, wherein when executed by a computing device having a processor in communication with a memory, the computer-executable instructions cause the computing device to:
 (a) transmit, to a heating device in a first zone of an epitaxial reactor, an output power instruction representing a base output power;
 (b) determine an actual time period for a temperature in the first zone of the epitaxial reactor to reach a target temperature;
 (c) determine a difference between the actual time period and a reference time period;
 (d) determine an output power offset based on the difference; and
 (e) store the output power offset in the memory in association with the heating device;
 (f) iterating steps (a)-(e) to adjust the output power offset until the determined output power offset causes the temperature in the first zone to reach the target temperature within a predetermined range of the reference time period wherein each subsequent base output power equals the previous base output power plus the current output power offset.

16. The computer-readable storage medium of claim 15, wherein the output power instruction is a first output power instruction, and said instructions further cause the computing device to transmit, to the heating device, a second output power instruction representing a sum of the base output power and the output power offset.

17. The computer-readable storage medium of claim 16, wherein the actual time period is a first actual time period and the difference is a first difference, and said instructions further cause the computing device to:
 determine a second actual time period for the first zone of the epitaxial reactor to reach the target temperature after transmitting the second output power instruction;
 determine a second difference between the second actual time period and the reference time period; and
 adjust the output power offset based on the second difference.

18. The computer-readable storage medium of claim 15, wherein the output power instruction is a first output power instruction, the first zone is one of a plurality of zones in the epitaxial reactor, and the heating device is a first heating device of a plurality of heating devices in the epitaxial reactor, and said instructions further cause the computing device to:
 transmit a second output power instruction to a second heating device associated with a second zone;
 transmit a third output power instruction to a third heating device associated with a third zone; and
 transmit a fourth output power instruction to a fourth heating device associated with a fourth zone.

19. The computer-readable storage medium of claim 15, wherein the output power instruction is a first output power instruction, the first zone is one of a plurality of zones in the epitaxial reactor, and the heating device is a first heating device of a plurality of heating devices in the epitaxial reactor, and said instructions further cause the computing device to transmit a second output power instruction to a second heating device associated with a second zone, wherein the second output power instruction represents at least a ratio of a sum of the base output power and the output power offset associated with the first heating device.

20. The computer-readable storage medium of claim 19, wherein the base output power is a first base output power, and the output power offset is a first output power offset, said computer-readable storage medium further comprising computer-executable instructions such that transmitting the second output power instruction further comprises transmitting the second output power instruction additionally representing a second base output power and a second offset associated with the second heating device.

* * * * *